UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE ETHER COMPOSITION.

1,405,448.  Specification of Letters Patent.  Patented Feb. 7, 1922.

No Drawing.  Application filed February 25, 1921. Serial No. 447,800.

*To all whom it may concern:*

Be it known that I, PAUL C. SEEL, a citizen of the United States of America, residing at Rochester, in the county of Monroe and State of New York, have invented certain new and useful Improvements in Cellulose Ether Composition, of which the following is a full, clear, and exact specification.

This invention relates to a cellulose ether composition containing ingredients which enable it to be suitably manipulated and utilized in the plastic and analogous arts, such, for example, as sheet or film manufacture and varnish manufacture.

One object of this invention is to produce a composition which may be made into permanently transparent, strong and flexible sheets of suitable thinness that are substantially waterproof, are unaffected by ordinary photographic fluids, and in general possess the desirable properties of a support for sensitive photographic coatings. Other objects will hereinafter appear.

I have discovered that such a composition can be prepared by compounding cellulose ethers of the type indicated in U. S. Patent No. 1,188,376, Lilienfeld, June 20, 1916, with ethyl butyrate. The ingredients are combined by the use of a common solvent.

In carrying out one illustration of my invention, I use a suitable cellulose ether, preferably ethyl cellulose of the kind that is substantially insoluble in water and does not shrink to an undesirable amount in the photographic manipulations. To 100 parts of such ethyl cellulose I add 300 to 800 (say 500) parts of a mixture of benzol and ethyl alcohol, or any equivalent solvent, and also add 1 to 200 (say 50) parts of ethyl butyrate. The ingredients are thoroughly mixed into a homogeneous flowable composition. The substances are all of commercial grade, having sufficient purity to provide the necessary transparency and comparative freedom from color in the finished articles, such as photographic film base.

The proportions may be varied considerably, in order to change the viscosity for different uses. In the example hereinabove given, the dope or composition may be flowed properly under the customary conditions met with in film manufacture. When the film is made under such conditions from this dope, the volatile solvents evaporate sufficiently to leave a product having the desirable qualities for use in this art. The ethyl butyrate has a sufficiently high boiling point to maintain a considerable quantity of it in the film. I prefer to use the normal butyrate, but the isobutyrate is also useful, and I include both isomers under the term butyrate.

Having thus described my invention, what I claim as new and desire to secure by Letters Patent is:

1. A composition of matter comprising a cellulose ether and ethyl butyrate.

2. A composition of matter comprising ethyl cellulose and ethyl butyrate.

3. A composition of matter comprising a cellulose ether, ethyl butyrate and a common solvent.

4. A composition of matter comprising ethyl cellulose, ethyl butyrate and a common solvent.

5. A flowable film-forming composition of matter, comprising a cellulose ether, ethyl butyrate, benzol and ethyl alcohol.

6. A composition of matter comprising 100 parts of ethyl cellulose, 300 to 800 parts of a compound solvent comprising benzol and ethyl alcohol and 1 to 200 parts of ethyl butyrate.

7. As an article of manufacture, a sheet of deposited or flowed cellulose ether containing ethyl butyrate.

8. As an article of manufacture, a sheet of deposited or flowed ethyl cellulose containing ethyl butyrate.

Signed at Rochester, New York, this 18th day of February, 1921.

PAUL C. SEEL.